United States Patent [19]
Andreasson

[11] Patent Number: 5,570,732
[45] Date of Patent: Nov. 5, 1996

[54] LOG FEEDING DEVICE

[76] Inventor: Olof Andreasson, Bornvägen 9, S-794 32 Orsa, Sweden

[21] Appl. No.: 498,415

[22] Filed: Jul. 5, 1995

[30] Foreign Application Priority Data

Jul. 7, 1994 [SE] Sweden ................... 9402407

[51] Int. Cl.⁶ ................................... B27B 31/00
[52] U.S. Cl. ................... 144/248.3; 144/246.1; 144/248.7; 152/231; 198/624; 198/780
[58] Field of Search ................... 154/231, 237, 154/243; 198/624, 692, 698, 627, 780; 144/246 R, 246 A, 246 C, 208 R, 208 J.

[56] References Cited

U.S. PATENT DOCUMENTS

| | | |
|---|---|---|
| 1,320,667 | 11/1919 | Adams . |
| 2,448,730 | 9/1948 | Paraskevas . |
| 2,483,338 | 9/1949 | Douglas ........................ 144/208 J |
| 2,520,421 | 8/1950 | Mathewson et al. ............ 144/208 J |
| 2,608,224 | 8/1952 | Eklund et al. .................. 144/208 J |
| 2,631,637 | 3/1953 | Purdy . |
| 2,780,253 | 2/1957 | Joa . |
| 3,426,823 | 2/1969 | Rieger . |
| 3,574,316 | 4/1971 | Siepman et al. . |
| 3,696,853 | 10/1972 | Sobota et al. . |
| 3,768,533 | 10/1973 | Gower . |
| 4,385,650 | 5/1983 | Schmidt ......................... 144/246 C |
| 4,544,010 | 1/1985 | Friedewald . |
| 4,673,015 | 6/1987 | Andreasson . |
| 5,355,920 | 10/1994 | Tanguay ......................... 144/246 R |

FOREIGN PATENT DOCUMENTS

| | | | |
|---|---|---|---|
| 105038 | 7/1942 | Sweden ........................ 144/246 A |
| 316096 | 10/1969 | Sweden . | |
| 7800702 | 8/1981 | Sweden . | |
| 7714776 | 2/1982 | Sweden . | |
| 461513 | 2/1990 | Sweden . | |
| 468838 | 3/1993 | Sweden . | |
| 500766 | 8/1994 | Sweden . | |
| 643329 | 1/1979 | U.S.S.R. ....................... 144/246 C |
| 674905 | 7/1979 | U.S.S.R. ....................... 144/246 A |
| 712248 | 1/1980 | U.S.S.R. ....................... 144/246 R |

*Primary Examiner*—W. Donald Bray
*Attorney, Agent, or Firm*—Rolf Fasth

[57] ABSTRACT

The log feeding device includes a feeding wheel that has an upper side portion axially from a lower side portion and a rim extending therebetween. The side portions extend outwardly and laterally from the wheel. An elastic tire is mounted on the rim of the wheel between the upper and lower side portions. A flexible net is attached to the upper and lower side portions and is conformable to the shape of the elastic tire. The flexible net includes a plurality of chain strings that are attached to the side portions at connection points. Each chain string has one end attached to an upper connection point and an opposite end attached to a lower connection point so that there is a diagonal straight distance between the upper and lower connection points. One set of the chain strings forms an angle A relative to one side of the longitudinal axis and the other set forms the same angle A relative an opposite side of the longitudinal axis of the wheel. Each chain string has a length that is longer than the straight diagonal distance between the upper and lower connection points. In this way, the chain strings are movable between an unloaded and a loaded position. The chain strings are in an outer relaxed state when in the unloaded position and in a tensioned inner state when pressed radially inwardly towards the longitudinal axis of the wheel by the elongate member so that a portion of the chain strings is closer to the wheel compared to when the chain strings are in the outer relaxed state.

14 Claims, 3 Drawing Sheets

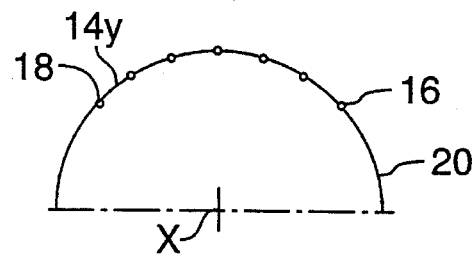
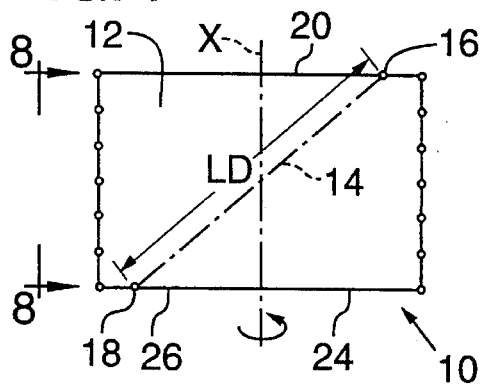
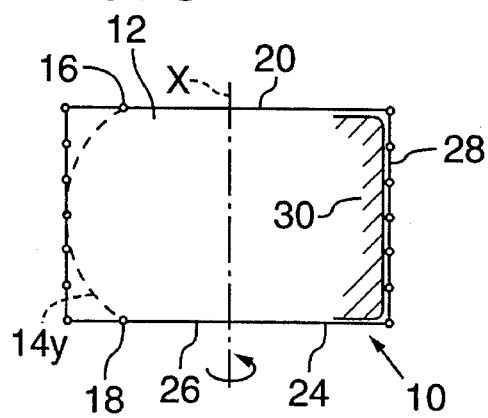
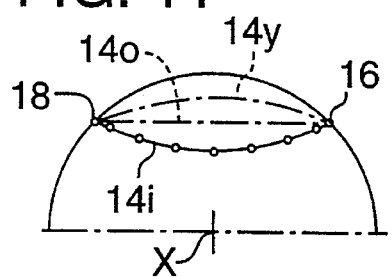
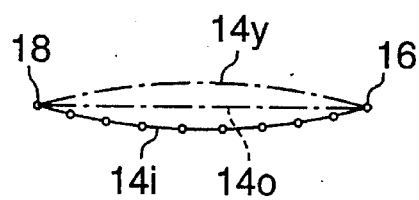
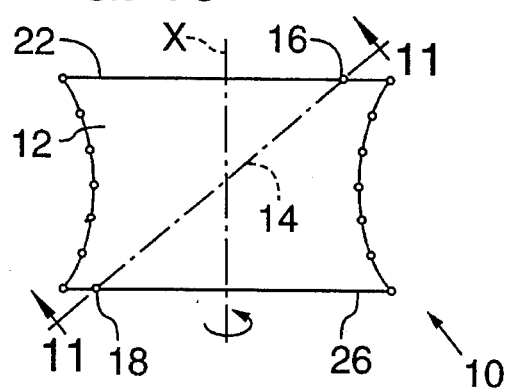
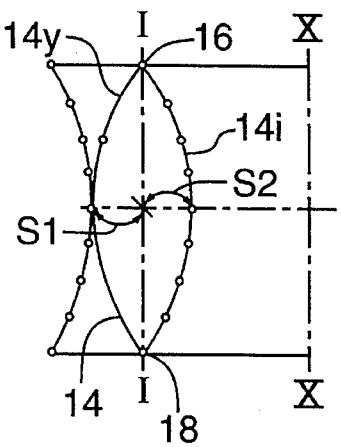

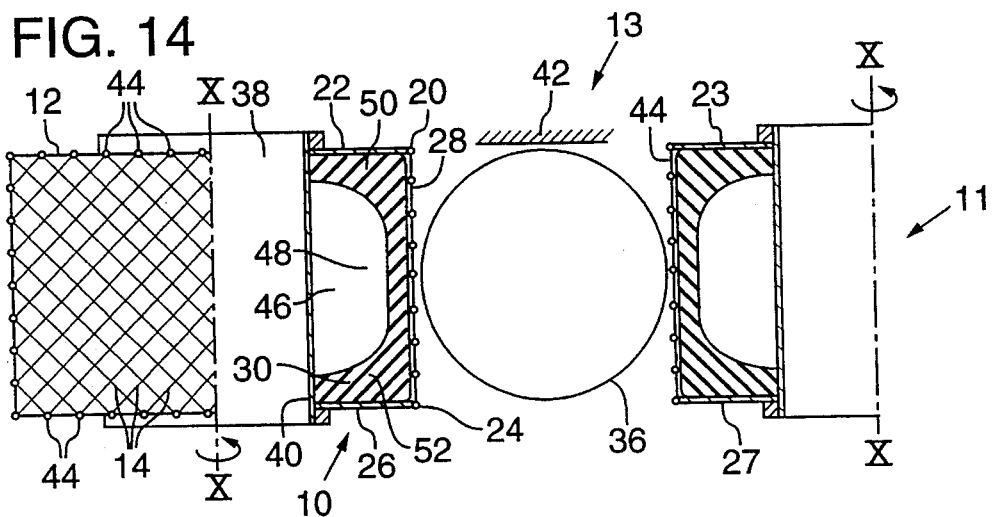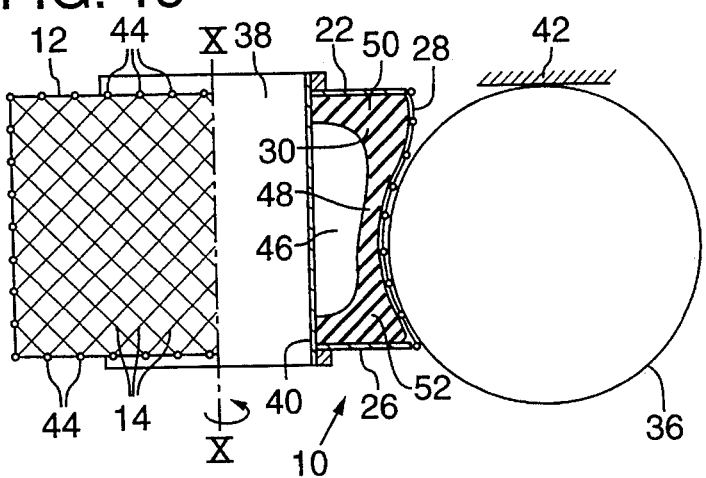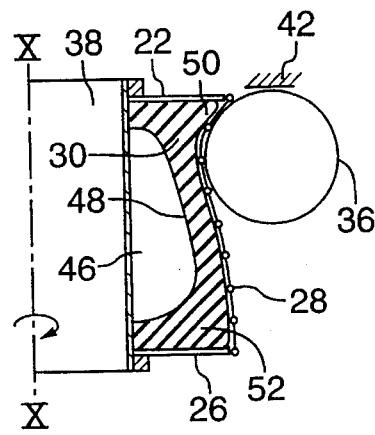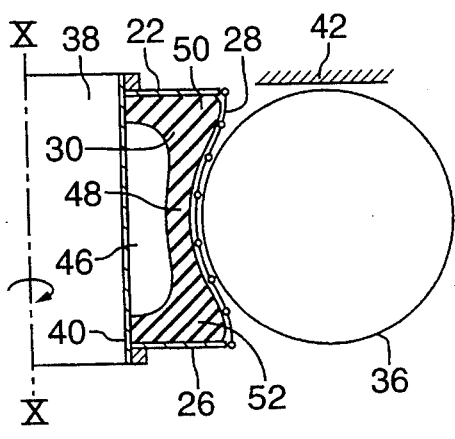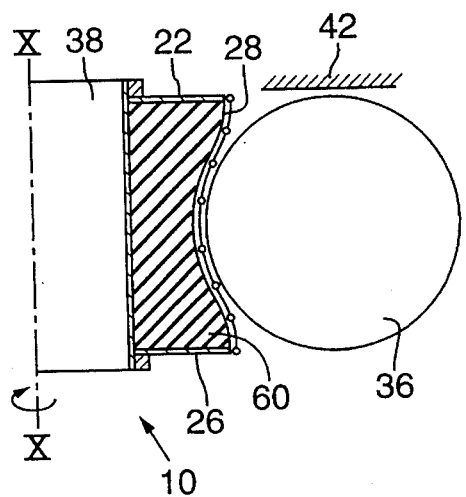

LOG FEEDING DEVICE

FIELD OF INVENTION

The present invention relates to a log feeding device particularly to a device for feeding/guiding tree trunks and logs having a varied diameter.

BACKGROUND AND SUMMARY OF INVENTION

The present invention is a log feeding device having a feeding wheel for feeding and guiding elongate objects having a substantially round cross section such as tree trunks, logs and similar objects. The object is fed relative to a wheel by bearing against a friction surface formed by the circumference of the wheel that is concentric with the longitudinal axis of the wheel. The friction surface may be described as a net of chain cables having chain strings that are connected to each other at intersections. The chain strings are, at each end, connected to an outer circumference of two side pieces attached to each wheel. The side pieces are concentric with the longitudinal axis of the wheel but are axially separated from each other. The chain cable net is supported by an elastic support surface that coincides with the friction surface. The support surface includes a peripheral surface of an elastic tire mounted to each of the feeding wheels.

The feeding wheel is used in machinery such as automated logging devices for harvesting timber. In this type of machinery, the feeding force is transferred to the tree trunk by two oppositely mounted feeding wheels each having a substantially vertical longitudinal axis. The trunk or log is guided so that the upper side of the trunk is horizontally fed through at a constant height relative to a device for removing branches from the trunk. The branch removing device is mounted subsequent to the feeding wheels. The bottom portion of the trunk is captured between the feeding wheels and the trunk is fed into the subsequently positioned branch removing device. The diameter of the trunk is often thicker at the bottom portion or root portion of the trunk and is gradually reduced toward the top portion of the trunk so that the diameter of the trunk is gradually reduced as the trunk passes between the feeding wheels with the root portion being fed in between the wheels first. The difference between the diameter of the bottom portion and top portion of a trunk may be substantial. When a forest is ready for thinning, the bottom portions of the tree trunks may have a diameter of about 35 centimeters and the top portion may have a diameter of about 5 centimeters or less. When the trees are ready for the felling stage, the bottom portions may be about 60 centimeters or larger and 5 centimeters or less at the top portion. The feeding wheels must therefore produce sufficient friction forces against the trunks during the whole process the trunks are being fed or guided therethrough despite the varying diameters of the trunks.

Accordingly, the trunk or log is horizontally fed with its upper side at a substantially constant height so that the upper side of the trunk is positioned at about the same level as the upper side of the feeding wheels and the upper edge of the elastic support surface. This means that the longitudinal axis of the trunk will also move vertically relative to the feeding wheels as the trunk is horizontally passed between the feeding wheels because the diameter of the trunk is becoming smaller and the trunk is pressed against an upper horizontal plate attached to the log feeding device. A trunk having a bottom portion with a diameter greater than the width of the feeding wheels is, at the beginning of the feeding process, positioned in an eccentric vertical position so that the under-side of the trunk is positioned below the under-side of the feeding wheels. As the trunk is fed through, the longitudinal axis of the trunk is positioned between the feeding wheels in a vertically centered position to finally be positioned in an eccentric vertical position so the under-side of the trunk is positioned above the under-side of the feeding wheels when the upper portion of the trunk, having a relatively small diameter, is passed between the feeding wheels.

The forces that affect the feeding process are mostly the rolling resistance of the feeding wheels, i.e. the deformation forces of the elastic tire that forms the elastic support surface, the branch removal forces and the friction forces formed between the branch removing knives and the trunk, and the friction forces formed between the ground and the tree crown being dragged thereon. The rolling resistance of the feeding wheels is of particular interest. It is desirable to achieve sufficient feeding forces at a specific feeding pressure, formed between the trunk and the feeding wheels, that, at the same time, is as low as possible to prevent damage to the surface of the trunk or log. In other words, the contact surface between the trunk and the feeding wheels should be as great as possible. This means that the feeding wheels having the net of chain cables mounted thereon must be able to effectively adjust themselves or conform to the shape of the trunk during the whole feeding process from the bottom portion of the trunk, having the greatest diameter, to the top portion having the smallest diameter. The net of chain cables must during this whole process conform to the trunk to effectively hold the trunk.

A known feeding wheel for holding and guiding tree trunks, according to Swedish patent SE 8902493-9, has two round side pieces and a net of cable chains including chain links that are connected to one another at points of intersections. This cable chain net has a concave profile and follows the shape of the concave rotation surface about the longitudinal axis of the wheel. The side pieces are preferably made of stiff metal plates and the points of attachment along the periphery of the plates can be somewhat compliant in the direction of the longitudinal axis. This construction is an improvement compared to the earlier known feeding wheels for this particular purpose. However, the construction has some limitations when it comes to effectively adjust itself, during the feeding process of the trunk, to the varied diameter of the trunk from the bottom portion to the top portion of the trunk. The concave profile of the wheel provides a relatively large contact surface between the trunk and the wheels which is advantageous. However, this concave profile may also provide a drawback when the top portion of the trunk is passed through the wheels. Since the feeding wheels have a relatively small diameter but a large width, the smallest possible concavity may be too large so that the peripheral surfaces of the wheels touch each other which reduces the pressure exerted against the trunk placed and guided between the wheels.

Another known feeding wheel for the intended purpose, according to Swedish patent SE-9000590-1, also uses a concentric friction surface having the form of a net of cable chains that conforms to a rotation surface having a concave symmetrical profile relative the longitudinal axis of the wheel. The net of cable chains is supported by or bears against, in this case, an elastic support surface that coincides with the rotation surface. The support surface includes a peripheral surface of an elastic tire mounted on the feeding wheel. The net of cable chains is connected to the rim of the feeding wheel and extends across the edge portions of the elastic support surface. In this case, the ability of the concave net of cable chains to evenly grip is combined with elasticity and the adaption characteristics of a rubber wheel. The risk of slippage between the wheel rim and the net of chain cables, attached to the rubber tire where the net of chain cables is not in contact with the wheel rim, is eliminated. The rubber tire may be a pneumatic tire or a solid rubber tire vulcanized to the wheel rim. During the feeding process, the rubber tire is subjected to substantial deformation followed by considerable heating of the tire and fatigue of the rubber material. This is particularly evident when the rubber tire is exposed to a tree trunk, during the feeding process, that has a successively varied diameter because the rubber tire is subjected to unevenly distributed deformation. The deformation of the rubber tire changes as the diameter of the tree trunk changes and the rubber material is fatigued. Pneumatic tires are therefore often punctured and solid tires have a tendency to detach from the tire rim.

An object of the present invention is to develop a feeding wheel that combines the constructive stability of the feeding wheel with a friction surface that includes a cable chain net that is attached to the outer periphery of side plates attached to the feeding wheel. The net has the ability to conform to the shape of the feeding wheel so that the net is supported by an elastic support surface that easily conforms to the shape of a tree trunk to effectively hold and guide the tree trunk as the diameter of the tree trunk is being reduced from its thick root portion to the thin top portion. Due to the improved ability to grip or hold the tree trunk, less pressure forces on the tree trunk and less driving forces of the feeding wheels are required.

The elastic tire has an outer profile, including the cable chain net attached thereto, that may extend along a straight line that is parallel to the longitudinal axis of the feeding wheel or the outer profile may be curved compared to the longitudinal axis of the wheel when viewed in a cross-sectional view through the longitudinal axis of the wheel.

When the cable chain net is provided in the form of a so called diagonal net, the chain strings extend between the connection points so that a first set of chain strings is sloping in a direction that is opposite to a second set of chain strings relative to the longitudinal axis of the wheels. The length of the chain strings, when stretched, is greater than the distance as represented by a straight line between the respective connection points. In this way, the chain strings, when not under load by the wheel, may be in an outwardly curved state. When the chain strings are under an inwardly directed radial load, the chain strings may, as the elastic tire is being deformed, first be in slack position and eventually be in an opposite inwardly curved and stretched position. In this position, the chain strings take tap a substantial amount of the load applied by a tree trunk that is positioned approximately right in between the side pieces of the feeding wheels.

The elastic tire may be made of a solid material. In the preferred embodiment, the tire has a chamber formed therein that is concentric with the longitudinal axis of the wheel. The chamber is open towards the rim of the wheel and is confined by the side portions of the elastic fire. The side portions have a relatively thick wall thickness compared to a midportion that has a relatively thin wall thickness.

The latter embodiment of the elastic tire permits a smooth adjustment to an object having a varied diameter such as root and top portions of a tree trunk, when there is a relatively large contact surface between the tree trunk and the elastic support surface of the feeding wheel.

The process of feeding an object, such as a tree trunk having a relatively thick root portion and a thinner top portion, may be described as follows.

During the feeding process, the upper side of a horizontal tree trunk bears against a stationary upper support plate that is at about the same height as the upper side portions of the feeding wheels. The tree trunk is fed therethrough with the root portion first. The root portion may have a diameter that is greater than the vertical distance between the side pieces of the feeding wheel. In the beginning of the feeding process, the tree trunks bears, via the cable chain net, against the respective lower portions of the elastic tires of the feeding wheels that are positioned on each side of the horizontal tree trunk. As mentioned earlier, the upper side of the tree trunk bears against the support plate. In this way, the elastic tires are subjected to inward elastic pressure. The cable chain net conforms to the deformation of the elastic tires at the contact areas of the peripheral portions of the feeding wheel. The elastic pressure against the tree trunk is essentially provided by the lower corner portion of the elastic tire. The tree trunk is guided in this way by three elements including the opposite feeding wheels and the upper support plate.

As the feeding process progresses, the diameter of the tree trunk is being reduced so that the tree trunk will eventually reach a position whereby its longitudinal axis is right between the side plates so that the tree trunk, via the cable chain net, exerts a pressure against a mid portion of each elastic tire. The mid portion of the elastic tire provides less deformation resistance compared to the corner portions so that the cable chain net takes up an increasing amount of pressure until the chain strings are stretched and net reaches a point of maximum inner deformation. The tree trunk is now substantially guided by the oppositely facing cable chain nets and the chain strings substantially enclose a portion of the tree trunk at opposite sides. The relatively thin mid portion of the elastic tire, as well as the corner portions of the tire, only provides minor pressure resistance in this situation.

As the feeding process progresses further, the relatively thin upper portion of the tree trunk bears, via the cable chain net, against both elastic tires and the upper stationary support plate. In this situation, the upper corner portion of the elastic tire is again subject to pressure forces from the tree trunk and the tree trunk is held by the stretched chain strings that follow and bear against the lower peripheral surfaces of the elastic tire.

The above described feeding process uses an elastic tire having a chamber defined therein and the tire has a mid portion with relatively thin wails. A similar process takes place when a solid elastic tire is used that is made of a material with suitable compression characteristics. This applies both to solid and hollow elastic tires having a straight profile or a suitable concave profile so that the radial outer periphery of the support surface is symmetrically curved relative to the longitudinal axis of the feeding wheel.

Because the feeding wheel is slidably mounted on the rim, and not attached thereto by a vulcanization process, it is no longer necessary that the rim is made of a material, such as steel, that is suitable for vulcanization of robber. The wheel rim may instead be of another lighter material such as a suitable light metal alloy. In this way, a feeding wheel having a light weight may be used which is particularly important for harvesting equipment of the one-grip type.

An embodiment of the present invention is described below with references to the attached drawings.

BRIEF DESCRIPTION OF THE DRAWINGS

FIG. 7 is a side view of the feeding wheel of the present invention.

FIG. 8 is a side view taken along line 8—8 in FIG. 7.

FIG. 9 is a top view of the feeding wheel of the present invention.

FIG. 10 is a side view of the feeding wheel of the present invention.

FIG. 11 is a view of the feeding wheel taken along line 11—11 in FIG. 10.

FIG. 12 is a plan view taken along line 11—11 in FIG. 10.

FIG. 13 is an enlarged view of a portion of FIG. 5.

FIG. 14 is a side view of a portion of an embodiment of the log feeding device of the present invention in an unloaded state.

FIG. 15 is a side view of the log feeding device under load.

FIG. 16 is a side view of the log feeding device under load.

FIG. 17 is a side view of the log feeding device under load.

FIG. 18 is a side view of the log feeding device under load having a solid elastic tire.

DETAILED DESCRIPTION

Figure 3:
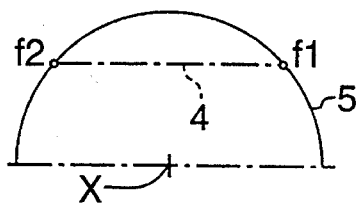
FIG. 3 is a top view of the prior art feeding wheel.
Figure 1:
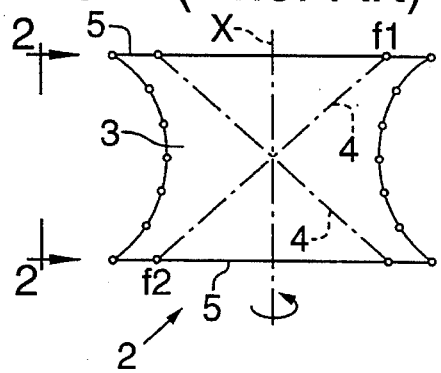
FIG. 1 is a side view of a prior art feeding wheel.
Figure 2:
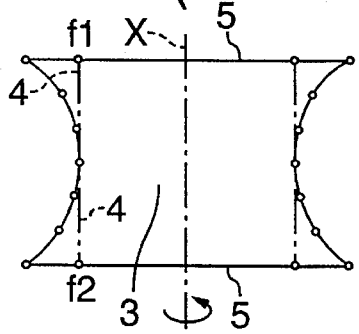
FIG. 2 is a side view taken along line 2—2 in FIG. 1.

FIGS. 1–3 show portions of a prior art logging device 2 having a net of chain cables 3 formed by diagonally intersecting cable strings 4. The cable strings are stretched so that they form a straight line between fastening points $f_1$ and $f_2$ positioned at the outer periphery of the side pieces 5. Thus, a pair of intersecting chain strings will form a plane I—I as shown in FIG. 2.

Figure 6:
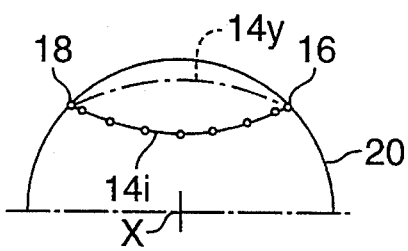
FIG. 6 is a top view of the feeding wheel of the present invention.
Figure 4:
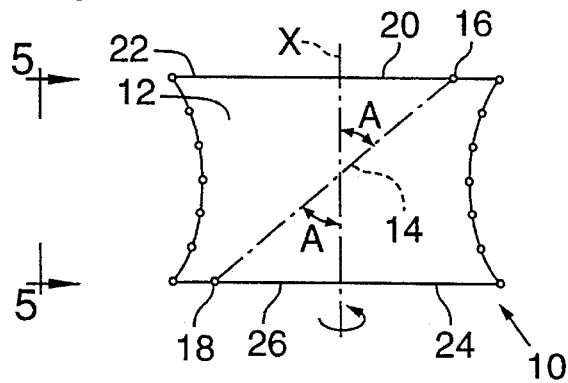
FIG. 4 is a side view of an embodiment of the feeding wheel of the present invention.
Figure 5:
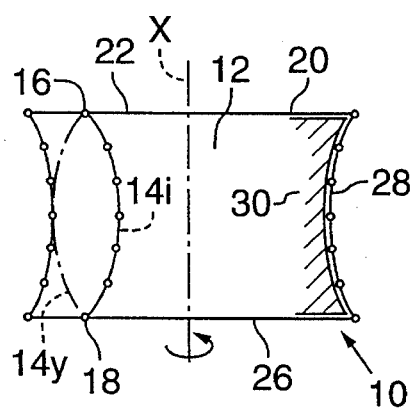
FIG. 5 is a side view taken along line 5—5 in FIG. 4.

FIGS. 4–6 are schematic depictions of a portion of a feeding wheel of the present invention. FIG. 4 is a side view of a portion of a feeding wheel 10, FIG. 5 is a side view along line 5—5 of FIG. 4 and FIG. 6 shows a top view of a portion of the feeding wheel 10. The feeding wheel 10 has a cable chain net 12 in the form of a diagonal network of chain strings 14 (only one string is shown in FIGS. 4 and 6). The chain string 14 has one end attached to a first fastening point 16 and the other opposite end attached to a second fastening point 18 so that the string extends diagonally across the wheel relative to a longitudinal axis X of the wheel. The first fastening point is located at and attached to an outer peripheral portion 20 of a first side piece 22 and the second fastening point 18 is located at and attached to an outer peripheral portion 24 of a second side piece 26. The side pieces 22, 26 are attached to the wheel and are axially spaced apart.

The length of each chain string 14 is longer than the straight distance between the fastening points 16, 18. The cable string 14 is therefore movable into an outwardly curved position $14_y$ or into an inwardly curved position $14_i$ relative the longitudinal axis X—X of the feeding wheel 10.

Each chain string 14 includes a plurality of chain links (not shown) that are linked together to form the chain strings. The links are axially adjustable so that the length of each chain string 14 may be adjusted as the chain string is moved from one curved position to another. In this way, the chain strings may be stretched or pulled apart to increase the length of the string or shortened by pushing the links together.

FIG. 5 shows the cable string in the position $14_y$ that is stretched to its outer curved or convex position and the position $14_i$ shows the chain string the inner curved or concave position in which the string is closer to the longitudinal axis of the feeding wheel. The upper portion of the string is attached to the first fastening point 16 and the lower portion of the string is attached to the second fastening point 18. Only two of the fastening points are shown to more clearly illustrate how the string is movable between the outer and inner positions. Of course, the net includes a plurality of diagonal chain strings that are attached to a plurality of fastening points along the side pieces.

The chain strings 14 are held in their outer position by bearing against an elastic support surface 28 including a peripheral surface of an elastic tire 30 that is mounted on the feeding wheel (as explained in detail below). The support surface 28 is concentric with the longitudinal axis X of the feeding wheel. When the support surface 28 is radially loaded by an object having a substantially circular cross section (such as a tree trunk or log), the contact surface of the feeding wheel is elastically and inwardly deformed towards the longitudinal axis X of the feeding wheel. When the support surface 28 is under such load, the chain strings 14 are pushed inwardly so that the chain strings are in the inner position $14_i$. As explained in detail below, the chain cable net 12 essentially supports the object with either substantial or minimal support provided by the elastic tire 30. The cooperation between the net 12 and the elastic support surface 28 varies depending upon the dimensions of the object and the position of the object relative to the support surface 28 of the feeding wheel.

FIGS. 7–9 show a portion of the feeding wheel 10 when the feeding wheel is in an unloaded state so that support surface 28 is similar to a straight cylindrical surface about the longitudinal axis X of the feeding wheel 10. Consequently, chain string 14 is in an unloaded state and extends between fastening points 16 and 18 diagonally across the cylindrical support surface 28 of elastic tire 30 (best seen in FIG. 7). Under radial inward load of the elastic tire 30, the chain strings 14 are curved inwardly which is the mirror image of the position when the strings are in the outer curved position $14_y$. The figures do not show the net in the inwardly curved position.

FIGS. 10 and 11 show the feeding wheel 10 that corresponds to the wheel depicted in FIGS. 7 and 9. The diagonal chain string 14 is shown in three different positions namely outer position $14_y$, inner position $14_i$ and a middle position $14_o$. Position $14_o$ is a position wherein the chain string is slack and extends between fastening points 16 and 18. FIG. 12 is an enlarged partial view along line 11—11 of FIG. 10 and shows the various positions of chain string 2 in actual dimensions. The position $14_y$ of the chain string is a mirror image of the position $14_i$ so that they are on each side of the slack middle position $14_o$.

As is apparent from the above, the chain string will bear against the elastic tire regardless of the state of deformation of the tire. When the chain string 14 is unloaded, it still conforms to the outer support surface 28 of the elastic tire 30 and bears against the support surface when an object is pressed against the feeding wheel 10. During such pressure, the chain string 14 will initially be in an undetermined slack position between the fastening points until the chain string 14 reaches its inner end position 14$_i$ in which the chain string may take up all the pressure from the object. Accordingly, the elastic tire, therefore, only takes up a minor portion of the pressure depending upon how the forces that are applied against the feeding wheel. In general, when the object, to be fed through by the feeding wheels, has a relatively large diameter, a substantial amount of the pressure forces is taken up by a solid lower corner portion (described in detail below) of the elastic tire 30 and when the object has a relatively small diameter, a substantial mount of the pressure forces is taken up by a solid upper corner portion (also described in detail below) of the elastic tire 30. It is important to note that the chain strings are slack in their middle position 14$_o$. An unloaded chain string that is somewhat stretched (not slack) when it is attached to the fastening points (such as the chain strings used in the prior an devices) is subject to very large pressure forces when an object exerts radial pressure on to the feeding wheels. Experience indicates that the chain strings, as well as the side plates, have a tendency to be over loaded in such devices. Thus, this type of over-load may occur when a prior art feeding wheel, as shown in FIGS. 1–3, is used.

Feeding wheels of the present invention, having a profile as shown in FIGS. 4–18, are preferred for feeding and guiding of objects, having a cylindrical narrowing cross section, such as tree trunks and similar objects, through the feeding wheels. The use of a feeding wheel that has a convex contact surface is conceivable but is thought to only have a minor practical importance for tree trunks.

FIG. 13 shows a more detailed view of the left side of the feeding wheel shown in FIG. 5. As shown in the figure, the chain cable net 12 may be bent outwardly or protrude radially outwardly a distance $s_1$ compared to a straight string according to line I—I in FIG. 13. Similarly, the string may protrude radially inwardly a distance $s_2$ compared to the straight string according to line I—I wherein $s_1$ equals $s_2$ in length.

FIGS. 14–16 show some practical designs of the feeding wheels shown in FIGS. 7–9.

FIG. 14 shows two cooperating first and second feeding wheels 10, 11, both having cylindrical shapes, in contact with a substantially cylindrical object 36. A cross section of the halves of the feeding wheels 10, 11 facing the object 36 are shown. The fight half of the right feeding wheel 11 is not shown in FIG. 14. The feeding wheels 10, 11 are in contact with the object 36 without exerting a pressure against the object 36. The object 36 is guided vertically by bearing against a stationary upper support plate 42 that is generally attached to the log feeding device 13. The feeding wheels 10, 11 are rotatable in opposite directions about the respective longitudinal axis X—X. The feeding wheel 10 has a cylindrical tube-shaped wheel hub 38 and a wheel rim 40 from which two identical circular side pieces or wheel discs 22, 26 extend outwardly and laterally from each axial end portion of the wheel hub 38. It is to be understood that the side pieces may be attached to other parts of the feeding wheel and may extend at an angle (other than a right angle) relative to the longitudinal axis X. The feeding wheel 11 is identical to feeding wheel 10 but is not shown in as much detail. Of course, feeding wheel 11 may not be identical to feeding wheel 10. Similar to feeding wheel 10, the feeding wheel 11 has wheel discs 23, 27 extending therefrom and a cable chain net 44 extends between the wheel discs. All the descriptions of feeding wheel 10 also apply to feeding wheel 11.

The cable chains net 12 extends from the wheel disc or upper side piece 22 to the lower wheel disc or side piece 26 around the whole circumference of the side pieces 22, 26. The cable chain net, also called a diagonal net, includes a plurality of chain strings attached at fastening points 44 of the side pieces (best seen in FIG. 14). The chain strings and the longitudinal axis X—X of the feeding wheels form the same angle. It is to be understood, that the chain strings may each form a different angle with the longitudinal axis. Each chain string of the net 12 is attached to the periphery of the respective side pieces at the fastening points 44. When the net is not under load, the net 12 (and consequently the strings 14) have a straight profile in the longitudinal direction of the feeding wheels 10. Placed between the wheel discs 22, 26 is the elastic tire 30 that is concentric with the wheel hub 38 and the net 12. The tire 30, having an unchanged or even profile when not under load as seen in FIG. 14, extends about the feeding wheel 10. The net 12 bears against the periphery of the tire 30, more particularly against the support surface 28 of the tire 30. The elastic tire 30 bears against and fits on the outer periphery of the wheel rim 40. Wheel disc 22 is removably attached to the wheel rim 40 to provide access to the elastic tire 30 so that the elastic tire may be mounted on and removed from the wheel rim 40 inside the net 12 and placed between the wheel discs 22, 26.

An inner circular chamber 46 is formed inside the elastic tire 30 of the preferred embodiment so that the tire 30 has a mid section 48 with a relatively thin wall thickness and corner portions or side portions 50, 52 with relatively thick wall thickness.

According to the present invention, the elastic tire 30 is floatingly mounted onto the wheel rim 40 and is glidably supported by the rim while being sufficiently guided by the rim. It is to be understood that the tire may also be snugly mounted on the rim.

The feeding wheels described above provide substantial advantages and combines the effective ability to grip and stability of a conventional net of chain cables but with improved adaption to the forms of objects having a varied diameter without the drawbacks of the earlier feeding wheels having an elastically supported friction surface provided by a net of stretched chain cables.

These advantages of the feeding wheels according to the present invention are evident by a closer look at the process that takes place when the object 36, having a successively reduced diameter, is fed through between the feeding wheels 10, 11, as shown in FIGS. 14–17.

FIG. 15 shows feeding wheel 10 bearing against a side of object 36. An equivalent feeding wheel bears against the opposite side of object 36. A relatively large bottom portion or root portion of object 36, such as a tree trunk in this case, is held and fed between the pair of feeding wheels 10, 11. The figure only shows the left feeding wheel. An upper side of object 36 bears, during the feeding process, against the stationary support plate 42. This support plate is positioned at approximately the same height as the upper portion of the feeding wheel 10. The diameter of object 36 at the bottom portion thereof is presumed to be greater than the length of the feeding wheel 10 along the longitudinal axis. As shown in FIG. 15, the object bears against the lower portion 52 of tire 30 of feeding wheel 10 and is substantially supported by net 12 pressed against the lower corner portion or side portion 52 of the elastic tire 30 in addition to being supported by the corresponding portions of the opposite feeding wheel 11 (not shown). At the same time, object 36 bears against the stationary support plate 42. The cross section of the elastic tire 30 is also deformed in the areas of contact by some pressure exerted onto the mid portion 48 of the elastic tire 30. The diagonal chain strings 14 of net 30 conform to the deformation of the net 30 without much of the forces taken up by the chain strings 14. Most of the pressure on the feeding wheel is initially taken up by the lower solid corner portion of the elastic tire 30.

FIG. 16 shows the corresponding cross section of the feeding wheel 10 when the object 36 is fed to a position when the diameter of the object 36 is about the same as the width or length of the feeding wheel in the direction of the longitudinal axis. As shown in FIG. 16, the longitudinal axis X—X of the feeding wheel is now closer to the peripheral surface of the object 36 by compressing the corresponding parts of the mid portion 48. The chain strings 14 have now reached their bottom position 14i, according to FIG. 5, and provide most of the support of the object 36 although some support is provided by the upper and lower portions 50, 52 and the mid portion 48 of the elastic tire 30. It should be noted that this contact surface situation prevails during most of the time the object, in the form of a tree trunk, is passed through between the feeding wheels.

FIG. 17 shows a cross sectional view of the deformed wheel 10 at the end of the feeding process of the successively narrowing object 36 such as a tree trunk. The upper corner portion 50 in FIG. 17 is deformed similarly to the deformation of the corner portion 52 as shown in FIG. 15. The lower portion 52 only provides in significant support to the object 36. The radius of the impression of the tree trunk is less and the chain strings 14 are stretched about the same as the situation shown in FIG. 15. The object 36 still bears against the support plate 42.

As mentioned briefly earlier, the above described elastic tire has a chamber 46 formed therein that is defined by axially opposite side portions 22, 26 and the mid portion 48 positioned therebetween in addition to the rim 40 of feeding wheel 10. At the side portions 50, 52, the tire has a wall thickness that is greater than the wall thickness at the mid portion 48. This makes the chain cable net particularly suitable for applying forces against an object, which during the feeding process, has a gradually decreasing diameter. The feeding wheel can thus effectively handle an object that, in the beginning of the feeding process, has a diameter that exceeds the width of the feeding wheel, and that, at the end of the feeding process, has a diameter that is substantially less than the width of the feeding wheel. The feeding force is therefore applied elastically via the chain cable net against the object both in the beginning and at the end of the feeding process. The feeding wheel has the ability to adjust itself optimally to the large and small diameter of the object during the elastic pressure thereon. During most of the feeding process, the pressure forces are mostly applied directly by the chain cable net in approximately symmetrical fashion. This is always the most effective situation to transfer forces from the feeding wheel to the object.

In the above described embodiment, the elastic support surface of the feeding wheel has a profile that is parallel to a straight line along the longitudinal axis of the feeding wheel, as viewed in a plane through the longitudinal axis. In the preferred embodiment, this profile may also be a curved line that is symmetrical with the longitudinal axis of the feeding wheel. This latter profile provides an even better conformance of the cable chain net to the shape of the object.

A distinguishing feature of the present invention is that each chain string 14 has a length that is longer than a diagonal straight distance $L_D$ between connection points 16 and 18 (best seen in FIG. 7). The chain strings extend diagonally between the connecting points relative to the longitudinal axis of the feeding wheels. In the preferred embodiment, the chain strings form an angle A relative to the longitudinal axis. The angle A may be about 45°. Other angles may also be used. The chain strings are thus movable between two end positions ($14_y$ and $14_i$) as the chain strings bear against the outer support surface 28 of the elastic tire 30. When the chain string 14 is between the end positions, the chain string is not stretched which avoids the drawbacks of using a chain string that is stretched in the middle position like a straight line as is commonly used in the prior art. By using chain strings that are stretched in the middle position, the chain strings are subject to very high forces and there is a risk that the chain may be further stretched in the longitudinal direction in addition to the risk of deformation of the side pieces. Although the chain strings of the present invention are in a slack state at the contact area between the net and the tree trunk when the tree trunk 36 applies forces thereto, the chain strings are still held in their position along the contact area of the wheel while under pressure between the elastic tire 30 and the object 36.

The elastic tire 30 defines, as described above, the open ring-shaped chamber 46 that is facing the wheel rim 40 and is concentric with the elastic tire. The elastic tire may be designed without such a chamber and be a solid ring having a cross section that fills the whole area between the wheel rim 40 and the surrounding chain cable net. The outer profile of such a wheel may be similar to the hollow elastic fire. FIG. 18 shows an alternative solid elastic tire 60 of a log feeding device 10. The solid elastic tire 60, having no chamber defined therein, is sometimes preferred when the object 36 fed through the log feeding device has less variation in diameter so that the object is fed through the device with less changes in position relative to the side plates 22, 26 and the pressure forces on the object 36 may be applied with greater participation of the elastic support surface 28. The elastic tire 60, having suitable compliance characteristics, may provide an improved conformance to an object having an outer surface that is uneven.

The chain cable net may be a pure diagonal net or a chain net having a six sided pattern with zig-zag shaped links, as described in the Swedish patent SE-9000590-1.

While the present invention has been described in accordance with the preferred embodiment, it is to be understood that certain substitutions and alterations may be made thereto without departing from the spirit and scope of the claims. I claim all such modifications which fall within the following claims.

I claim:

1. A wheel for feeding and guiding elongate members, the wheel including a first and a second stiff circular side piece, the side pieces being concentric with the longitudinal axis of the wheel and axially spaced apart, each side piece having an outer periphery that is attached to a cable chain net, the cable chain net being concentric with the longitudinal axis of the wheel, the cable chain net including sets of chain strings that are attached to the outer periphery of the side pieces at connection points, each chain string having one end attached to an upper connection point and an opposite end attached to a lower connection point, the upper connection point being spaced apart a distance from the lower connection point, one set of chain strings forming an angle A relative to one side of the longitudinal axis of the wheel, the other set of chain string forming the same angle A relative to an opposite side of the longitudinal axis of the wheel, the chain cable net bearing against an elastic support surface, the elastic support surface including a peripheral surface of an elastic tire that is mounted on the wheel, comprising:

the peripheral surface of the elastic tire extending between the side pieces, the peripheral surface extending substantially to the connection points of the chain strings at the outer periphery of the side pieces, each chain string having a length that is greater than the distance between the upper and lower connection points at the outer periphery of the side pieces, each chain string being movable between an unloaded and a loaded position, the chain strings being in an outer relaxed state when in the unloaded position, the chain strings being in a tensioned inner state when pressed radially inwardly towards the longitudinal axis of the wheel by the elongate member so that a portion of the chain strings is closer to the wheel compared to when the chain strings are in the outer relaxed state.

2. A wheel according to claim 1 wherein the support surface has an outer surface profile that is parallel with the longitudinal axis of the wheel.

3. A wheel according to claim 1 wherein the support surface has an outer surface profile that is a symmetrically curved along the longitudinal axis of the wheel.

4. A wheel according to claim 2 wherein the wheel has an outer rim and the elastic tire has side portions that are axially spaced apart and a mid portion connecting the side portion, the elastic tire has a cavity formed therein that is facing the rim and is defined by the axially opposite side portions and the mid portion of the elastic tire, the side portions have a first wall thickness and the mid portion has a second wall thickness, the first wall thickness being greater than the second wall thickness.

5. A wheel according to claim 3 wherein the wheel has an outer rim and the elastic tire has side portions that are axially spaced apart and a mid portion connecting the side portion, the elastic tire has a cavity formed therein that is facing the rim and is defined by the axially opposite side portions and the mid portion of the elastic tire, the side portions have a first wall thickness and the mid portion has a second wall thickness, the first wall thickness being greater than the second wall thickness.

6. A wheel according to claim 2 wherein the wheel has an outer rim and the elastic tire is solid and has an inner periphery that bears against the rim of the wheel.

7. A wheel according to claim 3 wherein the wheel has an outer rim and the elastic tire is solid and has an inner periphery that bears against the rim of the wheel.

8. A wheel according to claim 1 wherein the elastic support surface is the peripheral surface of the elastic tire, the wheel has an outer rim and the elastic wheel is slidably mounted on the rim.

9. The log feeding device according to claim 1 wherein each chain string has a length that is greater than a distance between the upper connection point attached to one end of the chain string and the lower connection point attached to the opposite end of the chain string.

10. A log feeding device, comprising:

a feeding wheel having a longitudinal axis, the feeding wheel having an upper portion axially separated a distance from a lower portion of the feeding wheel, the feeding wheel having a rim extending between the upper and lower portions thereof, an upper side portion attached to the upper portion of the feeding wheel, the upper side portion extending outwardly and laterally from the wheel, a lower side portion attached to the lower portion of the wheel, the lower side portion extending outwardly and laterally from the wheel, an elastic member having a shape, the member being mounted on the rim of the wheel between the upper and lower side portions, a flexible net attached to the upper and lower side portions, the net being conformable to the shape of the elastic member, the flexible net including a plurality of interconnected chain strings, and each chain string having a length that is greater than the distance between the upper and lower portions of the feeding wheel so that the chain strings are in a relaxed curved state when not under load and in a tensioned curved state when under load by a force that is perpendicular to the longitudinal axis of the feeding wheel.

11. The log feeding device according to claim 10 wherein the chain strings extend diagonally between the upper and lower side portions relative to the longitudinal axis of the feeding wheel.

12. The log feeding device according to claim 10 wherein the elastic member defines a cavity facing the rim of the feeding wheel.

13. The log feeding device according to claim 12 wherein the elastic member has an upper side wall and an opposite lower side wall with a contact surface side wall extending therebetween, the upper and lower side walls having a first wall thickness and the contact surface side wall having a second wall thickness, the first wall thickness being greater than the second wall thickness.

14. The log feeding device according to claim 10 wherein each chain string has one end attached to a connection point at the upper portion and the opposite end attached to a connection point at the lower portion, each chain string has a length that is greater than a straight distance between the connection point at the upper connection point and the connection point at the lower portion.

* * * * *